United States Patent
Younes et al.

(10) Patent No.: US 7,670,501 B2
(45) Date of Patent: *Mar. 2, 2010

(54) CARBON DIOXIDE BLOWN LOW DENSITY, FLEXIBLE MICROCELLULAR POLYURETHANE ELASTOMERS

(75) Inventors: Usama E. Younes, McMurray, PA (US); David M. Baily, Upper St. Clair, PA (US); Charles R. Carpenter, Upper St. Clair, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 968 days.

This patent is subject to a terminal disclaimer.

(21) Appl. No.: 11/139,847

(22) Filed: May 27, 2005

(65) Prior Publication Data

US 2006/0270746 A1 Nov. 30, 2006

(51) Int. Cl.
*C09K 3/00* (2006.01)
(52) U.S. Cl. .................. 252/182.24; 521/130; 521/133; 521/137; 521/170; 521/172; 521/174; 252/182.27; 252/182.28; 252/182.29
(58) Field of Classification Search ................ 521/130, 521/137, 170, 172, 174; 252/182.24, 182.27, 252/182.28, 182.29
See application file for complete search history.

(56) References Cited

U.S. PATENT DOCUMENTS

| 5,246,977 | A |   | 9/1993  | Mussini ......................... 521/159 |
| 5,840,778 | A | * | 11/1998 | Althausen et al. ............. 521/99 |
| 5,849,944 | A |   | 12/1998 | Allen et al. .................... 560/26 |
| 6,022,903 | A | * | 2/2000  | Younes et al. ................ 521/133 |
| 6,458,861 | B1 |  | 10/2002 | Younes ......................... 521/130 |

FOREIGN PATENT DOCUMENTS

| DE | 3916873 A1 | 12/1989 |
| EP | 1466932 A1 | 10/2004 |

* cited by examiner

*Primary Examiner*—John Cooney
(74) *Attorney, Agent, or Firm*—Lyndanne M. Whalen; Noland J. Cheung

(57) ABSTRACT

Microcellular polyurethane flexible foams having densities no greater than 0.3 g/cc which are suitable for use as lightweight shoe sole components are produced with carbon dioxide in an amount such that the polyurethane-forming mixture has a free rise density of from about 0.03 to about 0.3 g/cc. At least a portion of that carbon dioxide is dissolved as a gas into one or both of the reaction components. The amount of dissolved carbon dioxide must be such that the froth density of the isocyanate and/or isocyanate-reactive component(s) in which the carbon dioxide is dissolved will be from about 0.1 to about 0.8 g/cc. Additional carbon dioxide may be formed by the reaction of water and isocyanate during the polyurethane-forming reaction but the total amount of $CO_2$ present should be controlled to ensure that the polyurethane-forming mixture has a free rise density of from about 0.03 to 0.3 g/cc. Use of a preferred isocyanate-reactive component in which a specified ratio of diol to triol is satisfied makes it possible to use more water than had been expected. Use of a preferred prepolymer makes it possible to produce microcellular polyurethanes having good physical properties solely with a diol. The product microcellular foams possess a uniform cell structure and enhanced physical properties as compared to all water-blown foams of the same basic formulation and density. The hardness of the foams is more suitable for shoe sole, particularly midsole applications, than that of the water-blown foams, despite the lower urea hard segment content of the $CO_2$ blown foams.

16 Claims, No Drawings

CARBON DIOXIDE BLOWN LOW DENSITY, FLEXIBLE MICROCELLULAR POLYURETHANE ELASTOMERS

BACKGROUND OF THE INVENTION

The present invention relates to low density, flexible microcellular elastomers suitable for the preparation of molded shoe soles, shoe inners, and midsoles; to an isocyanate-reactive component useful for the production of such microcellular elastomers; to an isocyanate-terminated prepolymer useful for the production of such microcellular elastomers; and to a process for the production of such microcellular elastomers from such isocyanate-reactive component and/or isocyanate-terminated prepolymer in which (1) carbon dioxide is dissolved in one or both of the polyurethane-forming reaction mixture components in an amount sufficient to a froth density in such component or components of from about 0.1 to about 0.8 g/cc and (2) the amount of dissolved carbon dioxide plus carbon dioxide generated during the isocyanate/water reaction is sufficient to produce a polyurethane-forming reaction mixture having a free rise density of from about 0.03 to 0.3 g/cc.

Cushioned soles for footwear, particularly athletic footwear, are generally prepared from EVA (ethylenevinylacetate) microcellular foams. The processing of such foams is not straightforward, and the foams themselves do not have optimal properties. However, such foams continue to be used due to their availability in the very low density range, i.e., 0.1 g/cc to 0.35 g/cc.

Polyurethane polymers generally exhibit physical properties which are superior to EVA polymers. However, numerous difficulties arise when attempts are made to mold polyurethane microcellular elastomers at low densities. Due to the hardness required for the end use, considerable amounts of low molecular weight chain extenders are required. In microcellular foams which are water-blown, the urea short segments which are created cause the formulations to have poor processability, resulting in both shrinkage and splits in the parts. The physical properties are also compromised. These problems have prevented use of low density (<0.35 g/cc) polyurethane microcellular elastomers, and more particularly, very low density (<0.30 g/cc) polyurethane microcellular elastomers.

One of the most commercially important applications for microcellular polyurethane elastomers is production of shoe soles. These elastomers are generally produced from an iso-cyanate-terminated prepolymer, a polyol, a chain extender, a blowing agent and a surfactant. The properties of these microcellular elastomers are generally attributed to the specific prepolymer used to make the elastomer. (See, e.g., U.S. Pat. Nos. 5,246,977 and 5,849,944.)

U.S. Pat. No. 6,458,861 discloses carbon dioxide blown low density, flexible microcellular polyurethane elastomers which have a more uniform cell structure and enhanced physical properties than the previously known microcellular elastomers. These improvements are attributed to dissolution of the carbon dioxide blowing agent in one or both of the polyurethane-forming reaction components. Where water is included as a second blowing agent, U.S. Pat. No. 6,458,861 teaches that the water should be used in an amount which is less than 50% by weight of the total amount of water necessary to produce an all-water blown microcellular elastomer having the same density.

SUMMARY OF THE INVENTION

It has been surprisingly discovered that low density, and particularly very low density, polyurethane flexible microcellular elastomers may be prepared with a blowing agent composition which includes less dissolved $CO_2$ and, optionally, greater amounts of water than had previously been expected to be suitable for making such microcellular elastomers. It has been found that the optimum amounts of dissolved $CO_2$ are those amounts necessary to generate a froth density of the polyol and/or isocyanate component(s) in which the $CO_2$ is dissolved is from about 0.1 to about 0.8 g/cc, most preferably from about 0.2 to about 0.4 g/cc. When the dissolved $CO_2$ is used in conjunction with water as the blowing agent for a reaction mixture which includes an isocyanate-reactive component satisfying the criteria specified below and/or an isocyanate-terminated prepolymer satisfying the criteria specified below, the amount of dissolved $CO_2$ plus $CO_2$ generated by the isocyanate/water reaction should be sufficient to produce a polyurethane-forming reaction mixture having a free rise density of from about 0.03 to about 0.3 g/cc. Polyurethanes produced in accordance with the present invention exhibit mechanical properties, including relatively high hardness at low density, which make them eminently suitable for use in shoe sole components.

DETAILED DESCRIPTION OF THE INVENTION

The present invention relates to flexible microcellular polyurethane elastomers having densities less than or equal to 0.3 g/cc. These microcellular elastomers are elastomeric, or "rubbery" and should not be confused with microcellular rigid and semi-rigid foams produced by the high pressure RIM (reaction injection molding) process commonly used for producing car parts such as fenders, bumpers, and fascias. The microcellular flexible polyurethane elastomers of the present invention should also not be confused with conventional cellular flexible polyurethane foams. Conventional cellular flexible polyurethane foams have a coarse cell structure which is clearly visible by inspection with the naked eye, whereas microcellular elastomers have exceptionally small cells (i.e., an average cell size below 200 μm, and generally below 100 μm). The microcellularity of the elastomers of the present invention is often observable only as an added "texture" to the microcellular polyurethane part unless the part is examined under a microscope. Unlike microcellular elastomers, conventional polyurethane foams are routinely prepared at densities below 2 lb/ft$^3$ (0.17 g/cm$^3$) due to their larger cell size.

The present invention also relates to an isocyanate-reactive component which is particularly useful in the production of the microcellular polyurethanes of the present invention.

The present invention further relates to an isocyanate-terminated prepolymer which is particularly useful for the production of the microcellular polyurethanes of the present invention.

The present invention is also directed to a process for the production microcellular polyurethanes, particularly, molded microcellular polyurethanes, in which carbon dioxide is dissolved in the isocyanate-reactive component of the present invention and/or the isocyanate-terminated prepolymer of the present invention in an amount such that the froth density of the component(s) in which the $CO_2$ is dissolved is from about 0.1 to about 0.8 g/cc and the total amount of $CO_2$ in the polyurethane-forming reaction mixture (i.e., the total amount of dissolved $CO_2$ plus any $CO_2$ generated by reaction of isocyanate with water) is such that the foam-forming mixture will have a free rise density of from about 0.03 g/cc to about 0.3 g/cc.

As used herein, the term "polyurethane" means a polymer with a structure containing predominantly urethane (—NH—CO—O—) linkages between repeating units which may also include minor amounts (i.e., less than 5%) of allophanate, biuret, carbodiimide, oxazolinyl, isocyanurate, uretdione, urea, and other linkages in addition to the urethane linkages.

Microcellular polyurethane elastomers are prepared by reaction of an isocyanate component and an isocyanate-reactive component. In addition, various additives and processing aids such as surfactants, catalysts, stabilizers, pigments, fillers, etc., may be present. Suitable additives and processing aids are well known to those skilled in the art of flexible microcellular polyurethane elastomers. A blowing agent must also be present. The CFC blowing agents used for many years have, however, been superseded, and water has now become the principal blowing agent for such foams. However, in the present invention, both dissolved carbon dioxide and water are used as the blowing agent.

The isocyanate component of the microcellular elastomer "system" or "formulation" generally comprises an isocyanate-terminated prepolymer in major part. Such prepolymers are well known, and may be prepared by catalyzed or uncatalyzed reaction of a stoichiometric excess of at least one di- or polyisocyanate with a polyol. Examples of isocyanates which are readily available and frequently used to produce such prepolymers include toluene diisocyanate (TDI), particularly, 2,4-toluene diisocyanate (2,4-TDI), methylene diphenyl diisocyanate (MDI), particularly, 4,4'-methylene diphenyl diisocyanate (4,4'-MDI), polymeric MDI and modified MDI. Any of the other known isocyanates may also be used, including mixtures of isocyanates.

The polyol component used in preparing the prepolymer(s) ordinarily has a functionality of between 2.0 and 4.0 but polyol components having functionalities greater than 4.0 or less than 2.0 may also be used. The isocyanate content of the prepolymer (expressed as weight percent isocyanate groups, or "% NCO") may range from 5% to 30%, but is preferably in the range of from 15% to 25%. The isocyanate content of prepolymers used for shoe sole applications is most preferably range from about 18 to 22%.

The isocyanate component used in the practice of the present invention may include: (1) a single prepolymer; or (2) a mixture of prepolymers; or (3) a combination of a prepolymer with an isocyanate or a modified isocyanate. Isocyanates or modified isocyanates which may be present in the isocyanate component of the present invention include "monomeric" isocyanates such as any of the TDI isomers and isomeric mixtures, any of the MDI isomers and isomeric mixtures, polymeric MDI and/or modified isocyanates which include groups such as urethane, urea, allophanate, and particularly, carbodiimide groups. Such isocyanates are well known, and can be used individually or in mixtures. Aliphatic isocyanates such as isophorone diisocyanate can be used, but they are not preferred. Mixtures of prepolymers and "monomeric" isocyanates may also be used. The total isocyanate content of the isocyanate component when that isocyanate component is composed of (a) a mixture of at least one prepolymer and at least one monomeric isocyanate or (b) solely of monomeric isocyanate(s) may be higher than 25%.

In preparing a prepolymer to be included in the isocyanate component, any of the known hydroxy-functional materials may be used. Polyether polyols, polyester polyols, polyether-polyester hybrid polyols and mixtures or combinations thereof are preferably used. The hydroxyl functionality of the hydroxy-functional material(s) used to produce such a prepolymer may generally range from 1.2 to 8, preferably from 2 to 4, most preferably from 2 to 3, although higher functionalities may be used, preferably in minor quantities. Mixtures of lower and higher functionality polyols are sometimes advantageous. The functionality, as expressed herein, is the theoretical functionality based on the number of active hydrogens in the starter molecules from which the hydroxy-functional material(s) (preferably, polyether or polyester or polyether-polyester hybrid polyol(s)) is (are) prepared. That is, for any given polyol, the theoretical functionality will be a whole number. Mixtures of such polyols, for example, polyols produced from a mixture of di- and tri-functional starter molecules may result in a theoretical functionality which is between the functionalities of the starters. For example, a polyol produced from an equimolar mixture of ethylene glycol and glycerine will have a theoretical functionality of 2.5.

The theoretical functionality of a polyol must be distinguished from the actual, or measured functionality, which will always, in the case of polyether polyols, be less than theoretical due to side reactions which occur during polyoxyalkylation. For example, a 3000 Dalton (Da) molecular weight polyether diol will have a theoretical functionality of 2. If conventionally prepared by base catalyzed oxyalkylation, the actual functionality may be 1.6, while if prepared using low unsaturation polyoxyalkylation techniques, the actual functionality may range from 1.85 to about 1.97.

Particularly preferred isocyanate-terminated prepolymers useful for producing microcellular polyurethanes in accordance with the present invention have an NCO content of from 5 to 30%, preferably, from 15 to 25%, and are the reaction product of (1) a diisocyanate and/or polyisocyanate with (2) a polyol having a hydroxyl group functionality of from 1.2 to 8 and a number average molecular weight of less than 3,000 Da and optionally, (3) a chain extender. The polyols which are preferably used to produce these prepolymers include polyether polyols having an ethylene oxide content of from about 0 to about 30% and blends of one or more diols with one or more triols. Specific examples of such polyols are given below. The diisocyanate or polyisocyanate used to make these prepolymers is preferably a diphenylmethane diisocyanate ("MDI") or polymeric MDI. Preferred chain extenders for the production of these prepolymers include glycols, particularly, dipropylene glycol.

When an isocyanate-terminated prepolymer which is a reaction product of a diisocyanate or polyisocyanate, a polyol having a hydroxyl group functionality of from 1.2 to 8 and a number average molecular weight of less than 3,000 is used to produce a microcellular polyurethane in accordance with the present invention, any of the known isocyanate-reactive compounds may be used to produce the microcellular polyurethane elastomers in accordance with the present invention. Examples of such isocyanate-reactive compounds include polyether polyols, polyester polyols and hybrid polyether-polyester polyols. It is preferred, however, that the isocyanate-reactive component of the present invention described more fully below be used.

While the isocyanate-reactive component of the present invention may include any polyol having a hydroxyl group functionality of at least 1.7 and a molecular weight of from about 1,000 to about 12,000 Da, the isocyanate-reactive component preferably used to produce the microcellular polyurethanes of the present invention includes: (a) at least one polyol, preferably, at least one polyether, polyester or hybrid polyether-polyester polyol having a functionality of approximately 2 and a molecular weight of from about 1000 to about 12,000, preferably from about 1,500 to about 6,000; and (b) at least one polyol, preferably, at least one polyether, polyester or hybrid polyether-polyester polyol having a functionality of approximately 3 and a molecular weight of from about 1000 to about 12,000, preferably from about 3,000 to about 6,000. Additionally, polyols produced from mixed functional starters that have molecular weights from about 1000 to about 12000, preferably from about 1500 to about 6000 and functionalities of from about 1.2 to about 8, preferably from about 2 to about 4, may optionally be used. Polyether polyols are particularly preferred for the practice of the present invention. Any of the other known isocyanate-reactive materials may also be included in the polyol component in addition to the required difunctional polyol and trifunctional polyol.

When the preferred isocyanate-reactive component of the present invention is used to produce a microcellular polyurethane, any of the known diisocyanates and/or polyisocyanates may be used. It is preferred, however, that the isocyanate be an isocyanate-terminated prepolymer such as those described above as being particularly advantageous in the practice of the present invention.

Any material containing two or more hydroxyl groups and having a molecular weight of at least about 1000 may be included in the isocyanate-reactive component used in the practice of the present invention. Such materials include polyols such as polyester polyols, polyether polyols, polyether-polyester hybrid polyols, polyhydroxy polycarbonates, polyhydroxy polyacetals, polyhydroxy polyacrylates, polyhydroxy polyester amides and polyhydroxy polythioethers. Polyester polyols, polyether polyols and polyhydroxy polycarbonates are preferred.

Suitable polyester polyols include the reaction products of polyhydric alcohols (preferably dihydric alcohols to which trihydric alcohols may be added) and polybasic (preferably dibasic) carboxylic acids. In addition to these polycarboxylic acids, corresponding carboxylic acid anhydrides or polycarboxylic acid esters of lower alcohols or mixtures thereof may also be used to prepare the polyester polyols useful in the practice of the present invention. The polycarboxylic acids may be aliphatic, cycloaliphatic, aromatic and/or heterocyclic and they may be substituted, e.g. by halogen atoms, and/or unsaturated. Examples of suitable polycarboxylic acids include: gluccinic acid; succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include: ethylene glycol; 1,2- and 1,3-propylene glycol; 1,3- and 1,4-butylene glycol; 1,6-hexanediol; 1,8-octanediol; neopentyl glycol; cyclohexanedimethanol; (1,4-bis(hydroxymethyl)cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylolpropane. The polyesters may also contain a portion of carboxyl end groups. Polyesters of lactones, e.g., E-caprolactone or hydroxyl carboxylic acids such as ω-hydroxycaproic acid, may also be used.

Suitable polycarbonates containing hydroxyl groups include those obtained by reacting diols with phosgene, a diarylcarbonate (e.g., diphenyl carbonate) or cyclic carbonates (e.g., ethylene or propylene carbonate). Examples of suitable diols include: 1,3-propanediol; 1,4-butanediol; 1,6-hexanediol; diethylene glycol; triethylene glycol; and tetraethylene glycol. Polyester carbonates obtained by reacting polyesters or polylactones (such as those described above) with phosgene, diaryl carbonates or cyclic carbonates may also be used in the practice of the present invention.

Polyether polyols which are suitable for use in the practice of the present invention include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Suitable starting compounds containing reactive hydrogen atoms include polyhydric alcohols (described above as being suitable for preparing polyester polyols); water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris-(hydroxyl phenyl)-ethane.

The diol and triol present in the preferred isocyanate-reactive component for producing microcellular polyurethanes in accordance with the present invention are preferably present in that isocyanate-reactive component in an amount such that the ratio by weight (based on total weight of diol plus triol) of diol to triol is preferably from about 60-100% by weight diol to about 10-40% by weight triol, most preferably from about 80-90% by weight diol to about 10-20% by weight triol.

Other polyether and/or polyester polyols which are not diols or triols of the type required in the practice of the preferred embodiments of the present invention, such as those having functionalities greater than 3 or a molecular weight less than 1000 or more than 12,000, may also be included in the reaction mixture of the present invention in minor amounts, i.e., in an amount which is less than 30% by weight of the total weight of the isocyanate-reactive component, preferably less than 20%. When such optional materials are included in the isocyanate-reactive component, the diol to triol ratio may need to be adjusted in order to maintain proper cross link density of the polyurethane. Such adjustments are within the skill of those in the art and the extent to which the diol to triol ratio must be adjusted may be determined in accordance with techniques known to those skilled in the art.

The isocyanate-reactive component of the present invention also generally includes a chain extender, a surfactant and a catalyst. Typically, any chain extender included in the isocyanate-reactive component will have a functionality of approximately 2 and a molecular weight of no greater than 300 Da. Suitable chain extenders include: ethylene glycol; 1,2- and 1,3-propanediol; 1,4-butanediol; 1,6-hexanediol; diethylene glycol; dipropylene glycol; neopentyl glycol; and 2-methyl-1,3-propanediol. Because the chain extender is used in a relatively small amount, it is not generally necessary to adjust the diol to triol ratio in the isocyanate-reactive component. Suitable surfactants and catalysts are known to those skilled in the art and are discussed below.

The overall average equivalent weight of the polyol component, not considering chain extenders or any other additives or processing aids having isocyanate-reactive groups, is generally in the range of from about 1,000 Da to about 12,000 Da, preferably, from 1,000 to 3.000, more preferably from about 1,500 Da to about 2,000 Da. However, higher equivalent weight polyether polyols are also useful. The average theoretical functionality generally lies between 1.5 and 4, more preferably between 2 and 3.

In addition to polyether and polyester polyols and polyether-polyester hybrid polyols, "polymer polyols" may also be, and preferably are, included in the isocyanate-reactive component. Polymer polyols are polyols which contain dispersed polymer particles. While numerous polymer polyols are theoretically possible, and a variety are commercially available, the most preferred polymer polyols are those prepared by the in situ polymerization of unsaturated molecules in a base polyol, often with the aid of an unsaturated "macromer" polyol. The unsaturated monomers are most commonly acrylonitrile and styrene, and the acrylonitrile/styrene copolymer particles are preferably stably dispersed in amounts of 10 to 60% by weight based on total polymer polyol weight, more preferably 20 to 50%, and most preferably 30 to 45%. Such polymer polyols are available commercially. For example, ARCOL® E850 polymer polyol containing 43% polyacrylonitrile/polystyrene solids is available from Bayer MaterialScience. Polymer polyols in which urea particles are dispersed such as Multranol 9151 polyol which is also commercially available from Bayer MaterialScience are also particularly suitable for use in the isocyanate-reactive component of the present invention. When included in the isocyanate-reactive component, the polymer polyol is treated as a triol for the purpose of calculating the diol/triol ratio.

Where a polymer polyol is included in the isocyanate-reactive component, it is possible that no chain extender will be needed and the chain extender may be omitted from the isocyanate-reactive component. A polymer polyol, if used, is generally included in the isocyanate-reactive component in an amount of less than 20% by weight (based on total weight of microcellular elastomer). However, higher levels of polymer polyol may be used without any adverse effect upon product properties.

$CO_2$-blown microcellular polyurethanes prepared in accordance with the present invention with low (i.e., less than 0.20 meq/g) or ultra-low (i.e., less than 0.010 meq/g) unsaturation polyols exhibit high hardness at very low densities. Ultra-low unsaturation polyether polyols are available under the names Accuflex® and Acclaim® polyether polyols from Bayer MaterialScience. These Bayer polyols typically have unsaturation levels in the range of from 0.002 meq/g to 0.007 meq/g.

As used herein "high hardness" means high relative hardness as compared to a conventionally blown (CFC-blown) microcellular elastomer of similar density. While the very low density elastomers have high relative hardness, these elastomers have hardness values which are considerably lower than their water-blown analogs. The hardness of the water-blown elastomers, particularly at low density, renders such microcellular elastomers unsuitable for shoe sole applications.

The hardness range of the microcellular elastomers of the present invention is suitable for use in shoe soles, particularly midsole applications. Preferably, the hardness is at least 40 (Asker C) when the part density is about 0.22 $g/cm^3$ or less, and at least 50 (Asker C) at densities of 0.3 $g/cm^3$ or less. High hardness foams, for example, those with a hardness of 75 or more on the Asker C scale are preferably avoided for midsole applications.

Additives which may be added to the microcellular elastomer formulations are known to those skilled in the art and include surfactants, fillers, dyes, pigments, UV stabilizers, oxidative stabilizers, catalysts and the like.

A surfactant suitable for maintaining stability of the exceptionally fine cells is generally used. Examples of suitable commercially available surfactants include Dabco® SC5980, a silicone surfactant available from Air Products Co.; Dabco DC-5258, a silicone surfactant available from Air Products Co.; Dabco DC-5982, a modified polyether polysiloxane available from Air Products Co.; NIAX L-5614, a silicone surfactant available from GE Silicones; SH-8400, a polyether-modified silicone compound which is commercially available from Toray Silicone Company, Ltd.; Tegostab B8870, a surfactant which is commercially available from Goldschmidt; Tegostab B8905, a modified polyether polysiloxane which is commercially available from Goldschmidt; Tegostab B8315, a modified polyether polysiloxane which is commercially available from Goldschmidt; and Irgastab PUR 68, a mixture of esters and benzofuranone which is commercially available from Ciba Specialty Chemicals Corporation. Any of the other surfactants known to those skilled in the art would also be suitable.

Suitable fillers include: fumed or precipitated silica, quartz flour, diatomaceous earth, precipitated or ground calcium carbonate, alumina trihydrate and titanium dioxide.

Any of the conventional polyurethane catalysts (i.e., catalysts which promote the reaction of isocyanate and polyol) and catalysts which catalyze the isocyanate/water reaction may be used. Examples of suitable polyurethane catalysts include the various tin catalysts, particularly tin octoate, dibutyltin dichloride, dibutyltin diacetate, and dibutyltin dilaurate, and dimethyltin dimercaptide, bismuth catalysts such as bismuth nitrate; and tertiary amine catalysts such as triethylene diamine. These polyurethane catalysts are generally included in the isocyanate-reactive component in an amount of from about 0.01 to about 5 parts by weight, preferably from about 0.1 to about 3 parts by weight, based on total weight of polyols in the isocyanate-reactive component.

Examples of suitable isocyanate/water reaction catalysts include bis(dimethylaminoethyl)ether in dipropylene glycol which is commercially available from GE Silicones under the name Niax A1. These water/isocyanate catalysts are generally included in the isocyanate-reactive component in an amount of from about 0.05 to about 5 parts by weight, preferably from about 0.1 to about 1 parts by weight, based on 100 parts polyol. It is preferred that a catalyst capable of catalyzing both the urethane reaction as well as the isocyanate/water reaction be used because then only one catalyst is necessary. Triethylene diamine is an example of a catalyst which catalyzes both the urethane and the isocyanate/water reaction include a catalyst capable of promoting both the polyurethane-forming and the water/isocyanate reactions is generally included in the isocyanate-reactive component in an amount of from about 0.1 to about 5, preferably from about 0.5 to about 2 parts by weight, based on total weight of polyol.

The reactive elastomer formulations are generally formulated at isocyanate indices of from about 90 to about 120, preferably from about 95 to about 105, and most preferably about 100.

The microcellular elastomers of the present invention are blown with carbon dioxide. A portion of that carbon dioxide is in the form of gas which is dissolved as a gas under pressure into at least one of the isocyanate or isocyanate-reactive components. The gaseous carbon dioxide can be dissolved into either or both of the isocyanate and isocyanate-reactive components. Preferably, it is dissolved into the Isocyanate-reactive component. The remainder of the carbon dioxide is generated by the reaction of water present in the isocyanate-reactive component with the isocyanate during the polyurethane-forming reaction. The amount of carbon dioxide gas dissolved in one or both of the reaction components is generally an amount sufficient to generate a froth density of from about 0.1 to about 0.8 g/cc, preferably from about 0.2 to about 0.4 g/cc. The amount of water included in the isocyanate-reactive component is that which is necessary to generate sufficient carbon dioxide to supplement the dissolved carbon dioxide so that the free rise density of the foam-forming mixture will be from about 0.03 to about 0.3 g/cc, preferably from about 0.09 to about 0.2 g/cc. The desired free rise density is about one half of the density of the flexible microcellular polyurethane product.

For example, if the desired density of the flexible microcellular polyurethane product is 0.2 g/cc, the free rise density of the polyurethane-forming reaction mixture should be about 0.1 g/cc.

If too much water is present in or added to the isocyanate-reactive component, the number of urea linkages in the product increases and the Ross flex fatigue property is reduced. For example, addition of 1.3% water to the polyurethane-forming reaction mixture produces an elastomer having a cold Ross flex of about 70,000 cycles whereas addition of only 1.1% water to the reaction mixture produces an elastomer having a cold Ross flex of greater than 100,000 cycles.

The carbon dioxide gas to be dissolved in the reaction component(s) is introduced at modest pressure into the respective component storage tanks of the foam equipment, and given sufficient time to dissolve to the extent necessary. The amount dissolved may be measured by any convenient technique, including relative rates of diffusion through a membrane detector. The amount dissolved may range from 0.2 g/L to 4 g/L, preferably 0.5 g/L to 2 g/L, and more preferably 0.7 g/L to about 1.2 g/L. The higher the amount of dissolved $CO_2$, the lower the component density. The carbon dioxide may be conveniently fed to the storage tank at 50 lb/in$^2$ pressure, for a time sufficient to dissolve the desired amount of carbon dioxide. Unless specified otherwise, the amount of dissolved $CO_2$ is the average concentration in g/L based on the amounts of the isocyanate and isocyanate-reactive components.

While any of the other known blowing agents such as the HFC, HCFC's and hydrocarbons such as pentane may be used in small amounts (e.g., less than 20% of total blowing agent composition), use of these known blowing agents is not preferred.

It is also within the scope of the present invention to include gases such as air and nitrogen in the vessel or chamber in which the polyurethane forming reaction is conducted. Use of such gases is particularly advantageous to control the concentration of $CO_2$ in the head space.

The two or more reactant streams, generally one stream of isocyanate-reactive component and one isocyanate stream may be combined by any suitable method for preparation of microcellular elastomers, including mixing in a low pressure or a high pressure mixhead. A low pressure shoesole molding machine (i.e., Desma RGE 395) may be advantageously used. It is necessary, when practicing the subject invention, that the isocyanate-reactive component stream and/or isocyanate component stream already contain dissolved $CO_2$. Adding $CO_2$ only at the mix head or in a frother (e.g., an Oakes mixer) will not produce acceptable microcellular elastomers.

The benefits of the process of the present invention include considerable reduction of the amount of chain extender is possible when producing low density microcellular elastomers, thus enlarging the processing window and reducing splits and shrinkage. The high hardness at very low density of the microcellular elastomers produced in accordance with the present invention is in the range suitable for use in shoe sole components, while all-water blown microcellular foams have unacceptably high hardness.

Having generally described this invention, a further understanding of the present invention can be obtained by reference to certain specific examples which are provided herein for purposes of illustration only and are not intended to be limiting.

EXAMPLES

The materials used in the Examples which follow were:

PPOL A: An NCO-terninated prepolymer having an NCO content of 19.8% produced by reacting POLY A, dipropylene glycol, and diphenylmethane diisocyanate.

PPOL B: An NCO-terminated prepolymer having an NCO content of 19.7% produced by reacting POLY A, dipropylene glycol and diphenylmethane diisocyanate.

PPOL C: An NCO-terminated prepolymer having an NCO content of 20% produced by reacting POLY A, dipropylene glycol and diphenylmethane diisocyanate.

PPOL D: An NCO-terminated prepolymer having an NCO content of 19.6% produced by reacting POLY A, dipropylene glycol and diphenylmethane diisocyanate.

PPOL E: An NCO-terminated prepolymer having an NCO content of 19.77% produced by reacting POLY A, dipropylene glycol and diphenylmethane diisocyanate.

PPOL F: An NCO-terminated prepolymer having an NCO content of 19.73% produced by reacting POLY A, dipropylene glycol and diphenylmethane diisocyanate.

PPOL G: An NCO-terminated prepolymer having an NCO content of 19.53% produced by reacting POLY K, dipropylene glycol and diphenylmethane diisocyanate.

PPOL H: An NCO-terminated prepolymer having an NCO content of 20% produced by reacting POLY L, dipropylene glycol and diphenylmethane diisocyanate.

PPOL I: An NCO-terminated prepolymer having an NCO content of 19.59% produced by reacting POLY A, dipropylene glycol and diphenylmethane diisocyanate.

PPOL J: An NCO-terminated polyester prepolymer having an NCO content of 18.9% which is commercially available from Bayer MaterialScience LLC under the name Mondur 501.

PPOL K: An NCO-terminated prepolymer having an NCO content of 19.2% which is produced by reacting dipropylene glycol, POLY A and diphenylmethane diisocyanate.

PPOL L: An NCO-terminated prepolymer having an NCO content of 17.4% which is produced by reacting dipropylene glycol, POLY H and diphenylmethane diisocyanate.

PPOL M: An NCO-terminated prepolymer having an NCO content of 19.85% which is produced by reacting dipropylene glycol, POLY D and diphenylmethane diisocyanate.

PPOL N: An NCO-terminated prepolymer having an NCO content of 17.85% which is produced by reacting dipropylene glycol, POLY D and diphenylmethane diisocyanate.

PPOL O: An NCO-terminated prepolymer having an NCO content of 18.0% which is produced by reacting dipropylene glycol, POLY D and diphenylmethane diisocyanate.

PPOL P: An NCO-terminated prepolymer having an NCO content of 17.3% produced by reacting 6 parts by weight dipropylene glycol, 26.6 parts by weight of POLY M, 62 parts by weight of NCO A and 5.4 parts by weight of NCO B.

PPOL Q: An NCO-terminated prepolymer having an NCO content of 17.3% produced by reacting 6 parts by weight dipropylene glycol, 25.3 parts by weight of POLY N, 63.2 parts by weight of NCO A and 5.5 parts by weight of NCO B.

PPOL R: An NCO-terminated prepolymer having an NCO content of 17.6% produced by reacting 6 parts by weight of dipropylene glycol, 26.7 parts by weight of POLY A, 61.9 parts by weight of NCO A and 5.4 parts by weight of NCO B.

PPOL S: An NCO-terminated prepolymer having an NCO content of 17.8% produced by reacting 6 parts by weight of dipropylene glycol, 25.7 parts by weight of POLY D, 62.9 parts by weight of NCO A and 5.5 parts by weight of NCO B.

PPOL T: An NCO-terminated prepolymer having an NCO content of 18% produced by reacting POLY A, dipropylene glycol, and diphenylmethane diisocyanate.

PPOL U: An NCO-terminated prepolymer having an NCO content of 15% produced by reacting POLY M and diphenylmethane diisocyanate.

PPOL V An NCO-terminated prepolymer having an NCO content of 18% produced by reacting POLY 0 and diphenylmethane diisocyanate.

POLY A: An ethylene oxide-capped polyether diol having a molecular weight of 4,000 Da and an OH number of 28 which is commercially available from Bayer MaterialScience under the name Acclaim 4220.

POLY B: An ethylene oxide-capped polyether triol having a molecular weight of 6,000 Da and hydroxyl number of 28 which is commercially available from Bayer MaterialScience under the name Acclaim 6320.

POLY C: A propylene oxide initiated polyether diol having a molecular weight of 8,000 Da and a hydroxyl number of 14 which is commercially available from Bayer MaterialScience under the name Acclaim 8220.

POLY D: A polyether diol having a molecular weight of 2,000 Da and an OH number of 28 which is commercially available from Bayer MaterialScience LLC under the name Acclaim 2220.

POLY E: A polypropylene oxide-based triol modified with ethylene oxide having a molecular weight of 6,000 Da and an OH number of 28 which is commercially available from Bayer MaterialScience LLC under the name Multranol 9139.

POLY F: A polypropylene-based diol modified with ethylene oxide having a molecular weight of 4,000 Da and an OH number of 28 which is commercially available from Bayer MaterialScience LLC under the name Multranol 9190.

POLY G: A polyurea-filled polyether polyol which is commercially available from Bayer MaterialScience LLC under the name Multranol 9159.

POLY H: A polypropylene oxide-based diol modified with ethylene oxide having a molecular weight of 4,000 Da and an OH number of 28 which is commercially available from Bayer MaterialScience under the name Multranol 9111.

POLY I: A polymer polyol containing 43% by weight polyacrylonitrile/polystyrene as a dispersed phase available from Bayer MaterialScience under the name Arcol E850.

POLY J: A triol-based polyether polymer polyol having an OH number of 27 which is commercially available from Bayer MaterialScience LLC under the name Arcol 34-28.

POLY K: An EO/PO polyether diol having an OH number of 80 designated A 1205.

POLY L: A propylene oxide/ethylene oxide polyol having a hydroxyl number of 28 available from Bayer Material Science under the name Arcol Polyol 1027.

POLY M: A propylene oxide-based diol polyol having a molecular weight of 4000 Da and an OH number of 28 which is available from Bayer MaterialScience under the name Acclaim 4200.

POLY N: A polyether diol having an OH number of 56 which is commercially available from Bayer MaterialScience under the name Acclaim 2200.

POLY O: An ethylene oxide-containing polyether diol having a molecular weight of 3000 Da and an OH number of 35 which is commercially available from Bayer MaterialScience under the name Acclaim Polyol 3205.

BD: Butanediol.

EG: Ethylene glycol.

NCO A: 4,4'-diphenylmethane diisocyanate which is commercially available from Bayer MaterialScience under the name Mondur M.

NCO B: Carbodiimide-modified diphenylmethane diisocyanate which is commercially available from Bayer MaterialScience under the name Mondur CD.

CAT A: A 33% solution of an amine catalyst in ethylene glycol which is commercially available from Air Products under the name Dabco EG.

CAT B: Heterocyclic amine in glycol, available from Air Products under the name Dabco 1027.

CAT C: A dioctyltin dimercaptide which is commercially available from Witco Corporation under the name Foamrez UL-32.

CAT D: N,N-dimethyl-4-morpholine ethanamine which is commercially available from Air Products under the name Dabco XDM.

CAT E Dioctyltin dimercaptide which is commercially available from Crompton under the name Fomrez UL32.

CAT F Dibutyltin dilaurylmercaptide which is commercially available from Air Products under the name DABCO T120.

CAT G Pentamethyidiethylenetriamine which is commercially available from Air Products under the name PolyCat 5.

T571: A benzotriazole-based UV light absorbing agent which is commercially available from Ciba Geigy under the name Tinuvin 571.

T765: Bis(1,2,2,6,6-pentamethyl-4-piperidyl sebacate which is commercially available from Ciba Geigy under the name Tinuvin 765.

T101: Ethyl 4-(((methylphenylamino)methylene)amino)-benzoate which is commercially available from Ciba Geigy under the name Tinuvin 101.

SURF A: Silicone surfactant available from Air Products under the name DABCO DC-5258.

SURF B: Silicone surfactant available from GE Silicone under the name NIAX L-5614.

SURF C: A modified polyether polysiloxane available from Air Products under the name DABCO DC 5980.

SURF D: A polyether-modified silicone compound which is commercially available from Toray Silicone Company, Ltd. under the designation SH-8400.

SURF E: A modified polyether polysiloxane available from Air Products under the name DABCO DC-5982.

SURF F: A modified polyether polysiloxane which is commercially available from Goldschmidt under the name Tegostab B8870.

SURF G: A mixture of Esters and Benzofuranone available from Ciba Specialty Chemicals Corporation under the name IRGASTAB PUR 68.

SURF H: A modified polyether polysiloxane which is commercially available from Goldschmidt under the name Tegostab B8905.

SURF I: A modified polyether polysiloxane which is commercially available from Goldschmidt under the name Tegostab B8315.

General Procedure

The following procedure was used in each of the Examples given below.

The isocyanate tank of a low pressure shoe sole molding machine was charged with the prepolymer specified in the Table(s). The polyol tank was charged with the polyol component made up of the components specified in the Table(s).

$CO_2$ was dissolved in the polyol component in the amount indicated in the Table(s) under the pressure indicated in the Table(s). The isocyanate and isocyanate-reactive components were combined in the NCO/OH ratio indicated in the Table(s) while each of the tanks was maintained at 50 psi and 35° C. The mixture was molded into shoe soles which had the molded density reported in the Table(s).

The froth density reported in the Tables below is that attributed to dissolved $CO_2$ only, and is measured by taking a sample of the resin, allowing it to fully expand and then measuring its density. It is important to note here that unlike air nucleation which is common in urethane foams, the froth produced using dissolved $CO_2$ is a stable froth and does not collapse as is the case when air is used.

All of the amounts of the materials used in the Examples which follow are reported as parts by weight.

Examples 1-6

These examples illustrate microcellular elastomers made with different relative amounts of diol and triol in the polyol component.

TABLE 1

|  | EX | | | | | |
| --- | --- | --- | --- | --- | --- | --- |
|  | 1 | 2 | 3 | 4 | 5 | 6 |
| POLY A | 74.9 | 74.9 | 46.5 | 74.5 | 74.55 | 64.25 |
| POLY B | 25.1 | 25.1 | 53.5 | 25.5 | 25.45 | 5.5 |
| POLY I | 0 | 0 | 0 | 0 | 0 | 30.25 |
| BD | 23.77 | 23.77 | 10.72 | 0 | 8.46 | 30.25 |
| EG | 0 | 0 | 14.79 | 18.02 | 11.67 | 12.6 |
| Water | 0 | 0 | 0 | 0 | 0 | 1.68 |
| CAT A | 0.45 | 0.45 | 0.2 | 0.2 | 0.2 | 0.4 |
| CAT B | 0.34 | 0.34 | 0.3 | 0.3 | 0.3 | 0.3 |
| CAT C | 0.23 | 0.23 | 0.01 | 0.01 | 0.01 | 0.02 |
| SURF A | 0.45 | 0.45 | 0 | 0 | 0 | 0 |
| SURF B | 0 | 0 | 0.4 | 0 | 0 | 0 |
| SURF C | 0 | 0 | 0 | 2.0 | 2.0 | 2.0 |
| PPOL | A | A | B | C | C | D |
| NCO/OH | 1.01 | 1.01 | 1.31 | 1.12 | 1.07 | 1.2 |
| $D-CO_2$ $(g/l)^1$ | 1.27 | 1.60 | — | — | — | — |
| EX | 1 | 2 | 3 | 4 | 5 | 8 |
| FD $(g/cc)^2$ | 0.363 | 0.2 | — | — | — | — |
| FRD $(g/cc)^3$ | 0.28 | 0.18 | — | — | — | — |
| MD $(g/cc)^4$ | 0.45 | 0.22 | — | — | — | — |
| Hardness[5] | 85 | 67 | — | — | — | 72 |
| C Tear, kg/cm | 19 | 9.8 | — | — | — | — |
| Split Tear, kg/cm | 7.0 | 2.6 | — | — | — | — |
| Resilience, % | 30 | 28 | — | — | — | — |
| TStr. $(kg/cm^2)^6$ | 26 | 10.5 | — | — | — | — |
| % Elongation | 130 | 88 | — | — | — | — |

[1]$D-CO_2 = CO_2$ dissolved in polyol.
[2]FD = Froth Density of polyol component
[3]FRD = % Free Rise Density attributable to water + dissolved $CO_2$
[4]MD = Molded density
[5]Hardness = Asker C Hardness
[6]TStr = Tear Strength Examples 7-9

These Examples illustrate the use of polyol components which include a diol having a lower molecular weight than the diol used in Examples 1-6 to produce microcellular polyurethanes in accordance with the present invention.

TABLE 2

|  | EX | | |
| --- | --- | --- | --- |
|  | 7 | 8 | 9 |
| POLY C | 42.6 | 44.3 | 45.31 |
| POLY B | 28.35 | 29.8 | 51.47 |
| POLY D | 0 | 2.84 | 3.22 |
| POLY I | 29.05 | 25.9 | 0 |
| EG | 14.14 | 9.9 | 13.57 |
| Water | 1.0 | 1.34 | 1.54 |
| CAT A | 0.4 | 0.63 | 0.63 |
| CAT B | 0.3 | 0 | 0 |
| CAT C | 0.02 | 0 | 0 |
| CAT D | 0 | 0.3 | 0.3 |
| SURF C | 1.0 | 1.0 | 1.0 |
| SURF D | 0 | 0.4 | 0.4 |
| PPOL | G | E | A |
| NCO:OH | 1.14 | 0.95 | 1.2 |
| $D-CO_2$ $(g/l)^1$ | 1.61 | 1.27 | 1.5 |
| FD $(g/cc)^2$ | 0.189 | 0.363 | 0.246 |
| FRD $(g/cc)^3$ | 0.110 | 0.116 | 0.099 |
| MD $(g/cc)^4$ | 0.206 | 0.205 | 0.20 |
| Hardness[5] | 76 | 60 | 61 |
| C Tear, kg/cm | 9.3 | 7.1 | 6.0 |
| Split Tear, kg/cm | 2.4 | 1.9 | 2.3 |
| Resilience, % | 21 | 28 | 29 |
| TStr $(kg/cm^2)^6$ | 18.4 | 17.1 | 14.2 |
| % Elongation | 121 | 192 | 155 |

[1-6]Same meanings as in TABLE 1

Examples 10-11

These Examples illustrate the use of two different polyol components (each of which includes a polymer polyol) to produce microcellular polyurethanes in accordance with the present invention.

TABLE 3

|  | EX | |
| --- | --- | --- |
|  | 10 | 11 |
| POLY M | 44.0 | 0 |
| POLY E | 29.9 | 0 |
| POLY B | 0 | 29.78 |
| POLY F | 0 | 41.57 |
| POLY I | 26.1 | 25.86 |
| EG | 9.0 | 8.64 |
| Water | 1.34 | 1.0 |
| CAT A | 1.26 | 0.4 |
| CAT B | 0.4 | 0.3 |
| CAT D | 0.4 | 0.4 |
| SURF D | 0.4 | 0.4 |
| SURF E | 1.0 | 1.0 |
| PPOL | H | F |
| NCO:OH | 0.97 | 0.96 |
| $D-CO_2$ $(g/L)^1$ | 1.27 | 1.30 |
| FD $(g/cc)^2$ | 0.39 | 0.38 |
| $FRD^3$ | 0.1 | 0.09 |
| MD $(g/cc)^4$ | 0.22 | 0.22 |
| TStr $(kg/cm^2)^6$ | 17.9 | 20.7 |
| % Elongation | 189 | 205 |
| Hardness[5] | 63 | 53 |
| C Tear (kg/cm) | 9.5 | 8.2 |
| Split Tear (kg/cm) | 2.2 | 1.6 |
| Resilience (%) | 20 | 20 |

[1-6]Same meaning as in TABLE 1.

Examples 12-15

These Examples illustrate the use of polyol components in which a polymer is included to produce microcellular polyurethanes in accordance with the present invention.

TABLE 4

| | EX | | | |
|---|---|---|---|---|
| | 12 | 13 | 14 | 15 |
| POLY C | 41.84 | 41.84 | 41.84 | 41.84 |
| POLY B | 29.63 | 29.63 | 29.63 | 29.63 |
| POLY I | 25.76 | 25.76 | 0 | 25.76 |
| POLY D | 2.77 | 2.77 | 2.77 | 2.77 |
| POLY G | 0 | 0 | 25.76 | 0 |
| EG | 8.63 | 8.68 | 8.68 | 8.63 |
| Water | 1.33 | 1.33 | 1.33 | 1.33 |
| CAT A | 1.26 | 1.26 | 1.26 | 1.5 |
| CAT B | 0.4 | 0.4 | 0.4 | 1.2 |
| CAT D | 0.3 | 0.3 | 0.3 | 0.7 |
| CAT E | 1.06 | 1.06 | 1.06 | 1.06 |
| CAT F | 0.53 | 0.53 | 0.53 | 0.53 |
| SURF D | 0.4 | 0.4 | 0.4 | 0.4 |
| SURF E | 1.0 | 1.0 | 1.0 | 1.0 |
| PPOL | I | J | J | K |
| NCO:OH | 0.94 | 0.97 | 0.98 | 0.99 |
| D-$CO_2$ (g/l)[1] | 1.2 | 1.02 | 1.02 | — |
| FD (g/cc)[2] | 0.22 | 0.5 | 0.5 | — |
| FRD (g/cc)[3] | 0.11 | 0.12 | 0.133 | 0.097 |
| MD (g/cc)[4] | 0.22 | 0.22 | 0.22 | 0.22 |
| Hardness[5] | — | 51 | 49 | — |
| C Tear (kg/cm) | — | 8.5 | 9.9 | — |
| Split Tear (kg/cm) | — | 1.9 | 2.0 | — |
| Resilience, % | — | 32 | 36 | — |
| TStr (kg/$cm^2$)[6] | — | 10.4 | 8.9 | — |
| % Elongation | — | 206 | 229 | — |

[1-6]Same meaning as in TABLE 1.

Examples 16-20

These examples illustrate the use of polyol components in which different diols are used to produce microcellular polyurethanes in accordance with the present invention.

TABLE 5

| | EX | | | | |
|---|---|---|---|---|---|
| | 16 | 17 | 18 | 19 | 20 |
| POLY H | 70.61 | 0 | 0 | 0 | 0 |
| POLY E | 21.69 | 0 | 0 | 0 | 0 |
| POLY I | 7.7 | 7.7 | 25.76 | 0 | 0 |
| POLY D | 0 | 70.61 | 0 | 2.77 | 0 |
| POLY B | 0 | 21.69 | 29.63 | 29.63 | 21.69 |
| POLY C | 0 | 0 | 41.84 | 0 | 0 |
| POLY A | 0 | 0 | 0 | 41.84 | 0 |
| POLY J | 0 | 0 | 0 | 25.76 | 7.7 |
| POLY F | 0 | 0 | 0 | 0 | 70.61 |
| EG | 10.6 | 10.6 | 8.68 | 8.68 | 10.6 |
| Water | 1.3 | 1.3 | 1.33 | 1.33 | 1.3 |
| CAT A | 2.93 | 3.53 | 1.26 | 1.66 | 2.33 |
| CAT E | 1.0 | 1.0 | 1.0 | 1.0 | 1.0 |
| CAT F | 0.5 | 0.5 | 0.5 | 0.5 | 0.5 |
| CAT B | 0 | 0 | 0.4 | 0 | 0 |
| CAT D | 0 | 0 | 0.3 | 0.3 | 0 |
| EX | 16 | 17 | 18 | 19 | 20 |
| SURF G | 0.27 | 0.27 | 0 | 0 | 0.27 |
| SURF F | 0.5 | 0.5 | 0 | 0.2 | 0.5 |
| PPOL | L | M | N | N | O |
| NCO:OH | 1.22 | 1.15 | 1.04 | 1.06 | 1.15 |
| D-$CO_2$ (g/l)[1] | 1.25 | 1.5 | 1.1 | 1.1 | 1.16 |
| FD (g/cc)[2] | 0.38 | 0.25 | 0.5 | 0.5 | 0.35 |
| FRD (g/cc)[3] | — | — | — | — | 0.113 |
| MD (g/cc)[4] | 0.22 | 0.22 | 0.22 | 0.22 | 0.22 |
| Hardness[5] | 53 | 54 | 61 | 64 | — |
| C Tear, kg/cm | 8.5 | — | 7.6 | — | — |
| Split Tear, kg/cm | 2.3 | 2.1 | 2 | 2.3 | — |
| Cell Diameter, micrometer | — | — | 10 | — | — |
| Resilience, % | 24 | 20 | 23 | 27 | — |
| TStr (kg/$cm^2$)[6] | 13.5 | — | 11.7 | — | — |
| % Elongation | 219 | | 120 | | |

[1-6]Same meaning as in TABLE 1.

Examples 21-24

These Examples illustrate the use of different prepolymers to produce the microcellular polyurethanes of the present invention.

TABLE 6

| | EX | | | |
|---|---|---|---|---|
| | 21 | 22 | 23 | 24 |
| POLY D | 60.3 | 60.3 | 60.3 | 60.3 |
| POLY B | 18.5 | 18.5 | 18.5 | 18.5 |
| POLY I | 6.6 | 6.6 | 6.6 | 6.6 |
| EG | 9.1 | 9.1 | 9.1 | 9.1 |
| CAT A | 2.5 | 2.5 | 2.5 | 2.5 |
| SURF F | 0.4 | 0.4 | 0.4 | 0.4 |
| Water | 1.2 | 1.2 | 1.2 | 1.2 |
| UV Stabilizer | 1.5 | 1.5 | 1.5 | 1.5 |
| PPOL | P | Q | R | S |
| NCO:OH | 1.3 | 1.3 | 1.3 | 1.3 |
| D-$CO_2$ (g/l)[1] | 1.35 | 1.34 | 1.32 | 1.47 |
| FD (g/cc)[2] | 0.34 | 0.34 | 0.32 | 0.31 |
| FRD (g/cc)[3] | 0.12 | 0.123 | 0.113 | 0.102 |
| MD (g/cc)[4] | 0.22 | 0.22 | 0.22 | 0.22 |
| Hardness[5] | 51 | 49 | 50 | 56 |
| C Tear, kg/cm | 8.3 | 8.3 | 8.8 | 8.1 |
| Resilience, % | 21 | 20 | 22 | 21 |
| Split Tear, kg/cm | 2.2 | 2.1 | 2.2 | 2.1 |
| TStr (kg/$cm^2$)[6] | 16.3 | 17 | 17.5 | 19.2 |
| % Elongation | 251 | 250 | 228 | 233 |

[1-6]Same meanings as in TABLE 1.

Examples 25-29

These examples illustrate use of a polyol component which includes a polymer polyol to produce microcellular polyurethanes in accordance with the present invention.

TABLE 7

| | EX | | | | |
|---|---|---|---|---|---|
| | 25 | 26 | 27 | 28 | 29 |
| POLY A | — | — | — | 38.28 | 37.86 |
| POLY C | 36.45 | 36.45 | 36.58 | — | — |
| POLY B | 25.81 | 25.81 | 25.9 | 12.09 | 7.08 |
| POLY I | 22.44 | 22.44 | 22.52 | 33.58 | 32.81 |
| POLY D | 2.41 | 2.41 | 2.42 | — | — |
| BD | — | — | — | 15.11 | 17.88 |
| EG | 7.52 | 7.52 | 7.55 | — | 1.37 |
| CAT A | 2.2 | 2.2 | 1.1 | 0.34 | 0.43 |
| CAT E | — | — | — | 0.02 | — |
| CAT F | — | — | — | — | 0.09 |

TABLE 7-continued

| | EX | | | | |
|---|---|---|---|---|---|
| | 25 | 26 | 27 | 28 | 29 |
| CAT G | — | — | — | — | 0.43 |
| CAT B | 0.35 | 0.35 | 0.35 | 0.25 | — |
| CAT D | 0.26 | 0.26 | 0.26 | — | — |
| SURF D | — | 0.30 | — | 0.34 | 0.78 |
| SURF H | 0.43 | 0.35 | — | — | — |
| SURF I | — | — | 0.43 | — | — |
| SURF F | — | — | 0.43 | — | — |
| EX | 25 | 26 | 27 | 28 | 29 |
| Water | 1.16 | 1.16 | 1.05 | 0 | 1.28 |
| UV Stabilizer | 1.4 | 1.4 | 1.4 | — | — |
| PPOL | T | T | T | U | D |
| NCO:OH | 1.13 | 1.13 | 1.01 | 1.102 | 1.57 |
| D-$CO_2$ (g/l)$^1$ | 0.79 | 0.79 | 0.97 | 1.41 | 0.4 |
| FRD (g/cc)$^3$ | 0.119 | 0.119 | — | 0.287 | 0.14 |
| FD (g/cc)$^2$ | 0.6 | 0.6 | 0.5 | 0.267 | 0.8 |
| MD (g/cc)$^4$ | 0.22 | 0.22 | 0.22 | 0.29 | 0.22 |
| Hardness$^5$ | — | — | — | — | 60 |

$^{1-6}$Same meanings as in TABLE 1.

Examples 30-36

The following examples illustrate microcellular polyurethanes produced from a polyol component which contained no added water.

TABLE 8

| | EX | | | | | | |
|---|---|---|---|---|---|---|---|
| | 30 | 31 | 32 | 33 | 34 | 35 | 36 |
| POLY D | 61.12 | 61.12 | 61.12 | 61.12 | 61.12 | 61.12 | 61.12 |
| POLY B | 18.77 | 18.77 | 18.77 | 18.77 | 18.77 | 18.77 | 18.77 |
| POLY I | 6.66 | 6.66 | 6.66 | 6.66 | 6.66 | 6.66 | 6.66 |
| EG | 9.18 | 9.18 | 9.18 | 9.18 | 9.18 | 9.18 | 9.18 |
| CAT A | 2.54 | 2.54 | 2.54 | 2.54 | 2.54 | 2.54 | 2.54 |
| SURF F | 0.43 | 0.43 | 0.43 | 0.43 | 0.43 | 0.43 | 0.43 |
| Water | 0 | 0 | 0 | 0 | 0 | 0 | 0 |
| UV$^7$ | 1.30 | 1.30 | 1.30 | 1.30 | 1.30 | 1.30 | 1.30 |
| PPOL | T | T | T | T | T | T | T |
| Index | 99 | 99 | 99 | 99 | 99 | 99 | 99 |
| NCO:OH | 1 | 1 | 1 | 1 | 1 | 1 | 1 |
| D-$CO_2$ (g/l)$^1$ | 0.1 | 0.96 | 1.27 | 1.37 | 1.43 | 1.51 | 1.57 |
| FD (g/cc)$^2$ | 0.9 | 0.53 | 0.39 | 0.34 | 0.29 | 0.25 | 0.22 |
| FRD (g/cc)$^3$ | — | 0.293 | 0.263 | 0.255 | 0.245 | 0.241 | 0.222 |

$^{1-3}$Same meaning as in TABLE 1.
$^7$UV = UV Stabilizer

Having now fully described the invention, it will be apparent to one of ordinary skill in the art that many changes and modifications can be made thereto without departing from the spirit or scope of the invention as set forth herein. The terms "a" and "an" when used in the claims, mean "one or more" unless otherwise indicated. The terms "major" and "majority" mean 50% or more on a weight or mol basis as the case may be.

What is claimed is:

1. An isocyanate-reactive component for the production of a low density, flexible microcellular polyurethane elastomer comprising:
   a) a polyol having a hydroxyl group functionality of at least 1.7 and a molecular weight of from about 1,000 to about 12,000 Da,
   b) a catalyst,
   c) a surfactant,
   d) optionally, a crosslinking agent,
   e) optionally, water, and
   f) dissolved carbon dioxide in an amount ranging from 0.2 g/L to 4 g/L in which (1) the dissolved carbon dioxide is present in an amount such that the isocyanate-reactive component has a froth density of from about 0.1 to about 0.8 g/cc and (2) total amount of the dissolved carbon dioxide plus any carbon dioxide generated during reaction of the water with the isocyanate will when combined with a polyisocyanate produce a polyurethane-forming reaction mixture having a free rise density of from about 0.03 to 0.3 g/cc.

2. The isocyanate-reactive component of claim 1 in which more than one polyol is used as component a).

3. The isocyanate-reactive component of claim 2 in which a combination of a difunctional polyol and a trifunctional polyol is used as component a).

4. The isocyanate-reactive component of claim 3 in which the difunctional polyol is present in an amount of at least about 60% by weight, based on total weight of diol plus triol.

5. The isocyanate-reactive component of claim 1 in which water is present.

6. The isocyanate-reactive component of claim 1 in which the polyol has a hydroxyl functionality of from about 2 to about 4.

7. The isocyanate-reactive component of claim 1 in which a crosslinking agent is present.

8. The isocyanate-reactive component of claim 1 in which the polyol has an average hydroxyl functionality of from 2.01 to 2.5 and a crosslinking agent is present.

9. The isocyanate-reactive component of claim 1 in which the polyol has a molecular weight of from about 1,500 to about 6,000.

10. The isocyanate-reactive component of claim 1 in which the polyol is a mixture of a polyether diol and a polyether triol.

11. The isocyanate-reactive component of claim 1 in which the polyol is a polyester polyol.

12. The isocyanate-reactive component of claim 1 in which the polyol is a polyether polyol prepared from mixed starters.

13. The isocyanate-reactive component of claim 1 which further includes a polymer polyol.

14. The isocyanate-reactive component of claim 13 in which the polymer polyol is included in an amount of up to 50 parts by weight of polymer polyol for every 100 parts by weight of isocyanate-reactive component.

15. The isocyanate-reactive component of claim 1 which includes up to 30% by weight, based on total weight of polyol, of a polyol having a functionality greater than 3 but less than or equal to 8.

16. The isocyanate-reactive component of claim 1 in which at least one polyol having an unsaturation level below 0.020 meq/g is included.

* * * * *